Figure 1:
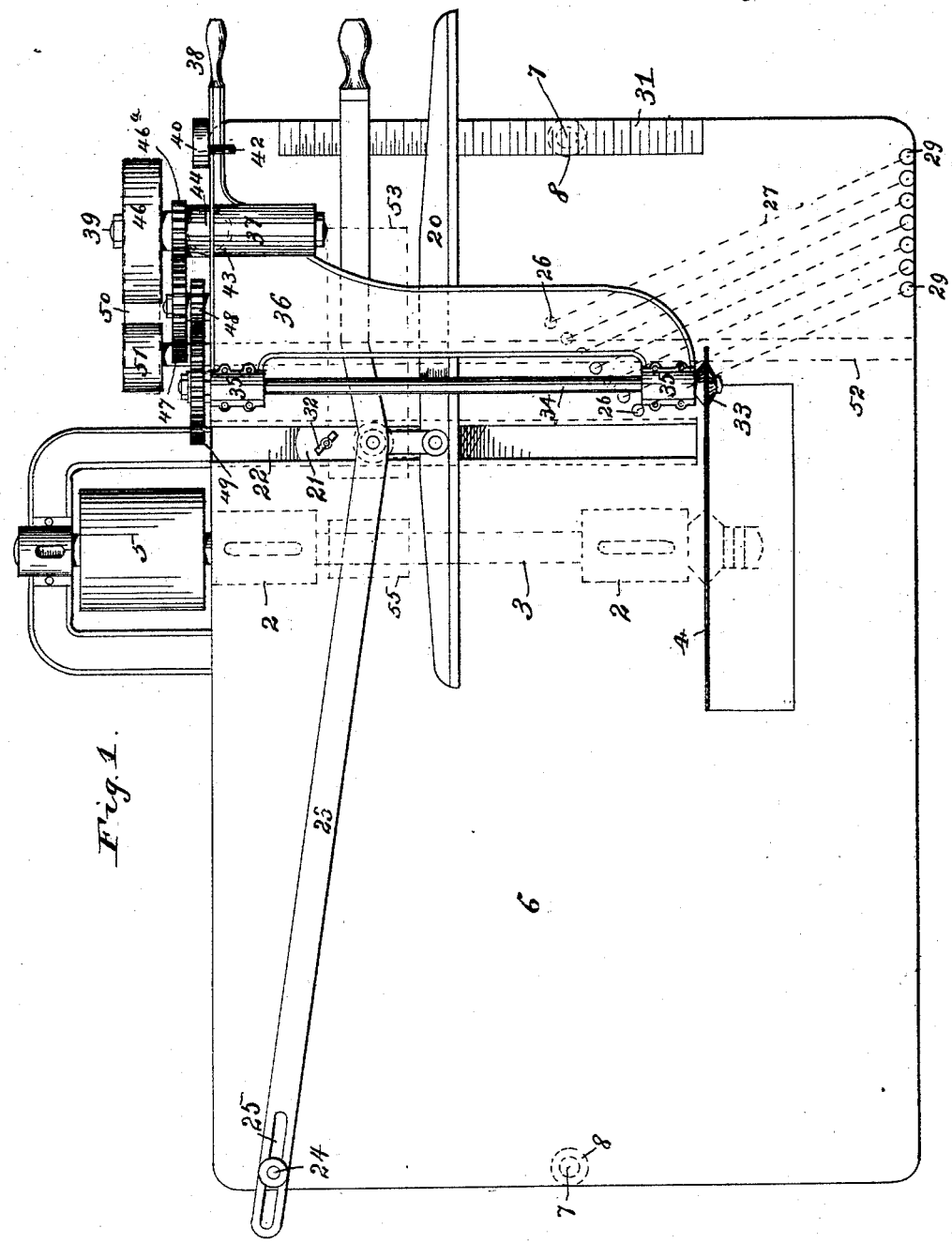

(No Model.)

3 Sheets—Sheet 1.

E. B. HAYES.
SAWING MACHINE.

No. 497,980.

Patented May 23, 1893.

Witnesses:—
Chas. W. Parker
J. S. Barker

Inventor.
E. B. Hayes,
by H. N. Low, attorney (No Model.) 3 Sheets—Sheet 2.
E. B. HAYES.
SAWING MACHINE.

No. 497,980. Patented May 23, 1893.

Witnesses:— Inventor:—
Chas W Parker E. B. Hayes,
J. S. Barker. by H. N. Low
attorney (No Model.) 3 Sheets—Sheet 3.

E. B. HAYES.
SAWING MACHINE.

No. 497,980. Patented May 23, 1893.

Witnesses
Chas W Parker
J. S. Barker

Inventor,
E. B. Hayes,
by H. N. Low
attorney

UNITED STATES PATENT OFFICE.

ELI B. HAYES, OF OSHKOSH, WISCONSIN.

SAWING-MACHINE.

SPECIFICATION forming part of Letters Patent No. 497,980, dated May 23, 1893.

Application filed August 29, 1892. Serial No. 444,352. (No model.)

*To all whom it may concern:*

Be it known that I, ELI B. HAYES, a citizen of the United States, residing at Oshkosh, in the county of Winnebago, State of Wisconsin, have invented certain new and useful Improvements in Sawing-Machines; and I do declare the following to be a full, clear, and exact description of the invention, such as will enable others skilled in the art to which it appertains to make and use the same.

My invention relates to that class of circular sawing machines usually termed rip-saws, and the invention is especially directed to improved means for raising the work-table relative to the saw according to the thickness of the stuff being worked, for feeding the lumber to the saw, which feeding means can be readily removed from proximity to the saw to expose the work-table and permit short stuff to be rapidly handled and sawed, and to means whereby the saw-gage may be conveniently and rapidly changed and set in one position or another according to the width of lumber which it is desired to cut off.

My feed mechanism is of the kind termed "self-feed." I arrange and mount the feed wheel, and connect it with the power mechanism, so that as the plank passes through the machine the feed wheel is free to rise without cramping its operating gears. Furthermore the whole feeding mechanism is so hung upon a pivotal support that it may be swung to one side away from the saw and from over the table leaving the machine adapted for operation upon short stuff that can be handled to a better advantage without the feed mechanism.

In preparing the lumber for many classes of work, for instance for sash, door or blind stock, it is cut or ripped into certain standard widths the wide planks being cut up into such widths as will utilize the lumber to the best advantage, skipping knots and bad spots in the plank. When the machine is thus employed there are repeated changes of the gage and it is a matter of great economy of the workman's time and of the capacity of the machine to enable the gage to be rapidly changed according to the requirements of the lumber and at the same time have the gage rigid and accurately set for one or the other of the standard widths of stock. By my improvements I attain these desirable ends by a series of pins and means whereby one or the other of them may be projected into the path of the gage and lock the latter rigidly in the desired position.

With these principal objects in view my invention consists in the parts and combinations thereof hereinafter set forth and claimed.

In order to make my improvements more clearly understood I have shown in the accompanying drawings means for carrying them into practical effect without however limiting the invention in its useful applications to the particular construction, which, for the sake of illustration, I have delineated.

Figure 2:
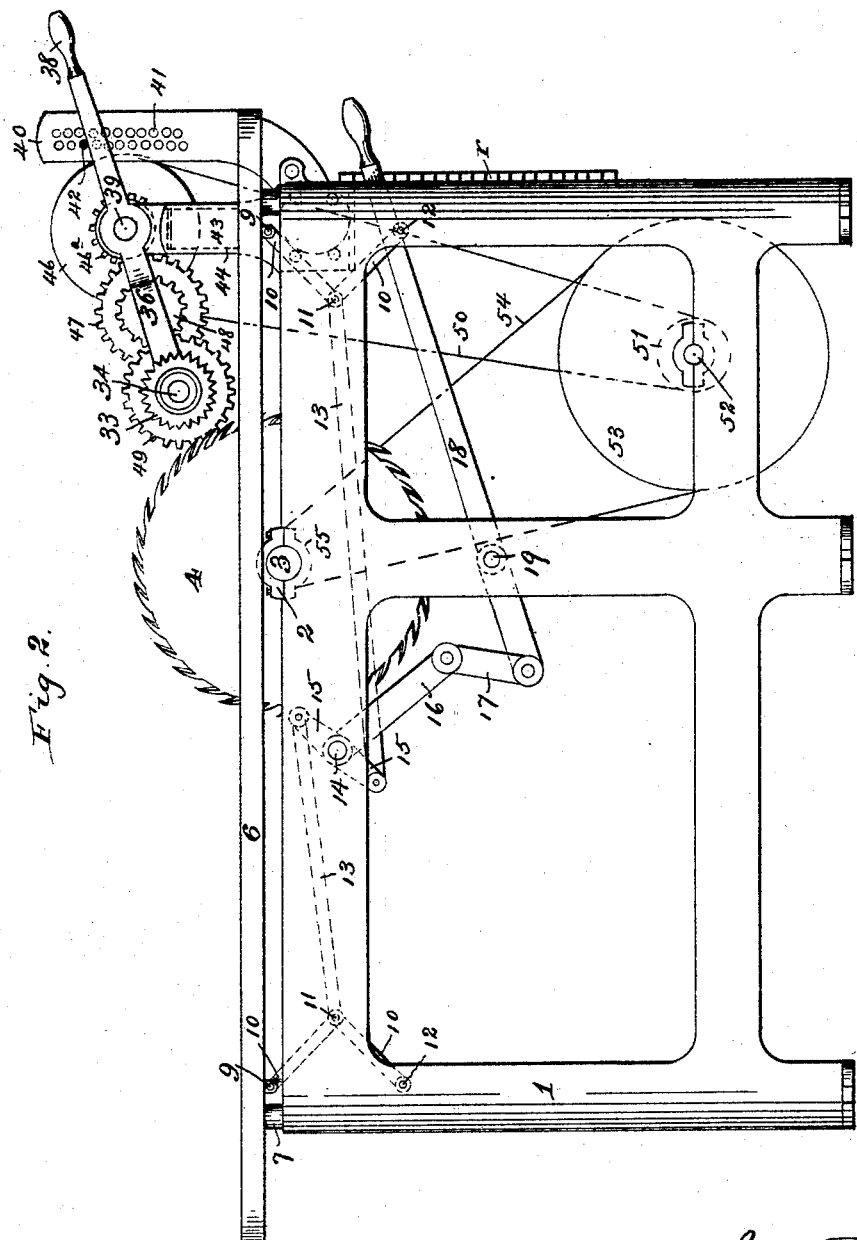
Figure 3:
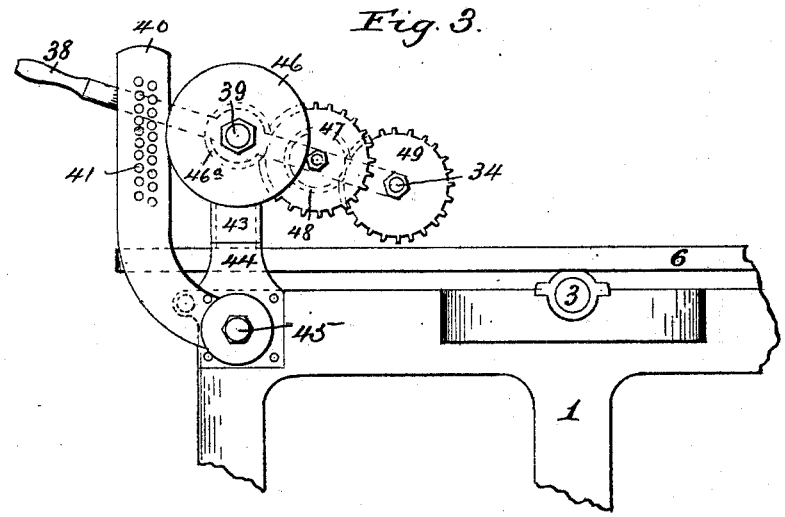
Figure 4:
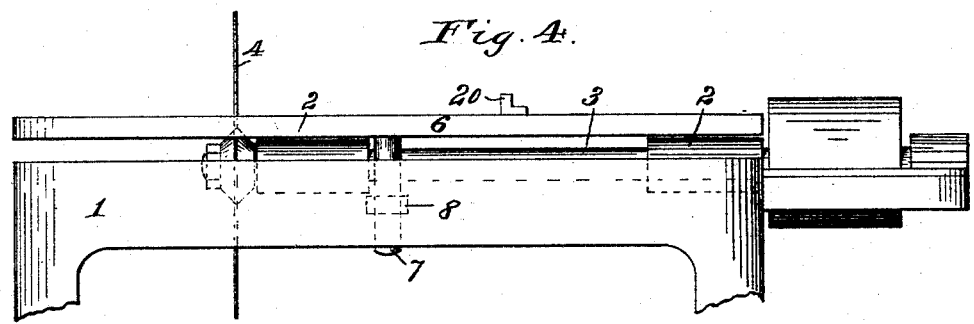
Figure 5:
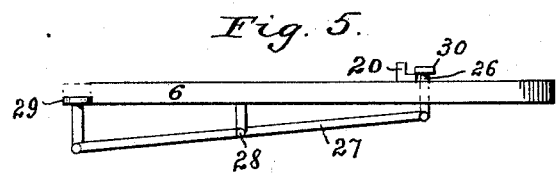

In said drawings—Figure 1 is a plan view of a self-feed circular sawing machine embodying my improvements. Fig. 2 is a side elevation of the same. Fig. 3 is an opposite side elevation of the feed-gear. Fig. 4 is a front view of a portion of the machine. Fig. 5 is a similar view showing one of the gage stops with its operating means.

Referring to the drawings 1 indicates the main supporting frame of the machine provided with suitable bearings 2 in which is mounted the main saw-shaft 3 provided with a circular saw 4 and driving pulley 5. Power is communicated to the machine through the latter pulley.

The work-supporting table is indicated at 6 and has two or more legs 7 which fit in corresponding bearings 8 on the frame 1, in which bearings the legs are adapted to have a vertical movement. At suitable points, preferably at or near the corners of the work table I attach by pivots 9 a set of oppositely arranged or inclined toggle links 10 pivoted to each other at 11 and to the main frame at 12. From the pivots 11 extend inward operating links 13 which are actuated by suitable mechanism to force outward or draw inward the pivots 11 and consequently raise or depress the work table in or on its bearings 8. For this purpose I employ a transverse rock shaft 14 mounted on the main frame and having the crank arms 15 pivoted to the links 13 as shown in Fig. 2. Said shaft has also a crank arm 16 connected by a link 17 with the hand lever 18, the latter being pivotally mounted at 19 upon the main frame. By this mechanism the operator is enabled with little expenditure of power to elevate or depress the work table. The work table receives from this adjusting mechanism no sidewise or horizontal unbalanced pressure. The hand lever 18 is held in place by any well known means such as a toothed rack r.

The side gage for the work is shown at 20 and is rigidly mounted on a slide 21 fitting in a guide 22 formed in the work table. The slide and gage are actuated by a hand lever 23 loosely pivoted to the table by a bolt or screw 24 which passes through a slot 25 in the lever, said lever being connected pivotally with the slide or gage.

Mounted in vertical bearings in the table so as to move up and down is a series of stop pins 26 situated at different distances from the saw, said distances being equal together with the width of the gage to the standard widths of stock to be produced.

In changing from one gage to another the gage 20 is moved to the left, the desired stop pin 26 elevated above the surface of the table and the gage moved back to the right against it in which position a firm and accurate side support for the lumber to be sawed is furnished. The pins 26 are preferably operated by key levers 27 on the inner ends of which they are pivotally mounted. Said levers are pivotally supported from the under side of the work table at 28 (Fig. 5) and are provided at their outer ends with finger keys 29 which may be properly marked to indicate the various widths of gage which they are adapted to produce. The pins 26 are formed with heads or projections 30 which are adapted to engage the top of the gage 20 or the top of a lateral flange thereof. The pins are thus supported and the gage very securely locked in position. It will be seen that with this apparatus the operation of changing the gage is practically instantaneous. In some instances it is necessary to saw other or odd widths of stock, and to that end the work table is provided with a scale 31 according to which the gage may be set, and the slide 21 is furnished with a clamp screw 32 which operates in a well known manner to secure the slide in the adjusted position.

The feed wheel which is adapted to engage the top surface of the lumber and feed it to the saw is shown at 33 situated in line with the saw and carried by a feed shaft 34. The latter is mounted in bearings 35 on a frame 36 formed with a bearing 37 and a handle 38. The latter bearing fits upon a horizontal stud 39 on which the frame 36 and the feed wheel may be given a vertical oscillation by the handle 38. The latter moves in contact with a vertical post 40 provided with perforations 41 in any desired one of which may be fitted a pin 42 to engage the handle 38 and hold the feed wheel at the desired height. The stud 39 is formed with a vertical sleeve 43 which latter is mounted upon a vertical stud 44 rigidly bolted to the main frame. Upon this latter stud the frame 36 may be horizontally revolved to carry the feed wheel away from proximity to the saw and leave the work table entirely exposed for the rapid manipulation of short stuff when it is desired to saw the latter. The normal tendency of the forward action of the feed wheel is to force the inner end of the frame 36 backward and the handle 38 outward, which is resisted by the post 40. When it is desired however to turn the feed frame as already described the pin 42 is removed and the post 40 turned downward upon the pivotal bearing 45 (Fig. 3) by which it is secured to the main frame.

46 is a belt pulley mounted upon the feed frame and having formed with it a pinion 46ª which engages a gear 47. The latter has a pinion 48 which engages a gear 49 on the feed shaft 34. The pulley 46 receives it motion by a belt 50 from a pulley 51 the latter being carried by a counter shaft 52 mounted on the lower part of the main frame and carrying a pulley 53 which is connected by a belt 54 with a feed pulley 55 on the saw shaft.

The operation of the machine hereinbefore described is sufficiently clear without further explanation.

What I claim is—

1. In a sawing machine the combination with the saw and its work table, of a gage mounted on the latter, means for moving the gage toward and from the saw, and a series of gage pins mounted in the table and adapted to be separately thrown in the path of the gage, and means for so actuating the pin substantially as set forth.

2. In a sawing machine the combination with the saw and the work table, of a gage movable toward and from the saw, a series of pins movable into and out of the path of said gage, and corresponding keys connected with said pins for operating them, substantially as set forth.

3. The combination with the work table and the gage, of the pins 26 having heads or projections 30 adapted to engage the top of the gage, and levers 27 for actuating the pins, substantially as set forth.

4. The combination with the saw, of a feed wheel and its actuating mechanism comprising the pulley 46, a frame carrying said wheel and mechanism and mounted on a vertical pivot or axis, a counter shaft beneath said frame and having the pulley 51, nearly beneath the pulley 46 and a substantially vertical belt adapted to drive said mechanism from the pulley 51, whereby in turning said mechanism on its vertical pivot the inward movement of said pulley 46 is compensated by a horizontal movement toward said pulley 51 substantially as set forth.

5. The combination with the saw, of a feed wheel and actuating mechanism, a frame supporting said wheel and mounted on a vertical pivot a handle or arm 38 connected with said frame, and a pivoted post 40 adapted to engage said arm, substantially as set forth.

6. The combination with the saw, of a feed wheel and actuating mechanism, a frame supporting said wheel, mounted on a vertical pivot, and adapted to move freely upward at the end upon which the said wheel is mounted, a handle or arm 38 connected with said frame, and a post 40 situated on the outer side of said arm and provided with an adjustable pin or stop adapted to sustain the inner end of said frame at the proper height for the thickness of the lumber, substantially as set forth.

7. In a sawing machine the combination with the saw and work-table, of a side gage, a series of vertically movable positive stop-pins therefor and means for holding the said pin in either an elevated or a depressed position, substantially as set forth.

In testimony whereof I affix my signature in the presence of two witnesses.

ELI B. HAYES.

Witnesses:
H. D. WILBOR,
S. R. MOODY.